No. 666,802. Patented Jan. 29, 1901.
G. D. FORD.
SEAT FOR FARM IMPLEMENTS.
(Application filed Sept. 5, 1900.)
(No Model.)
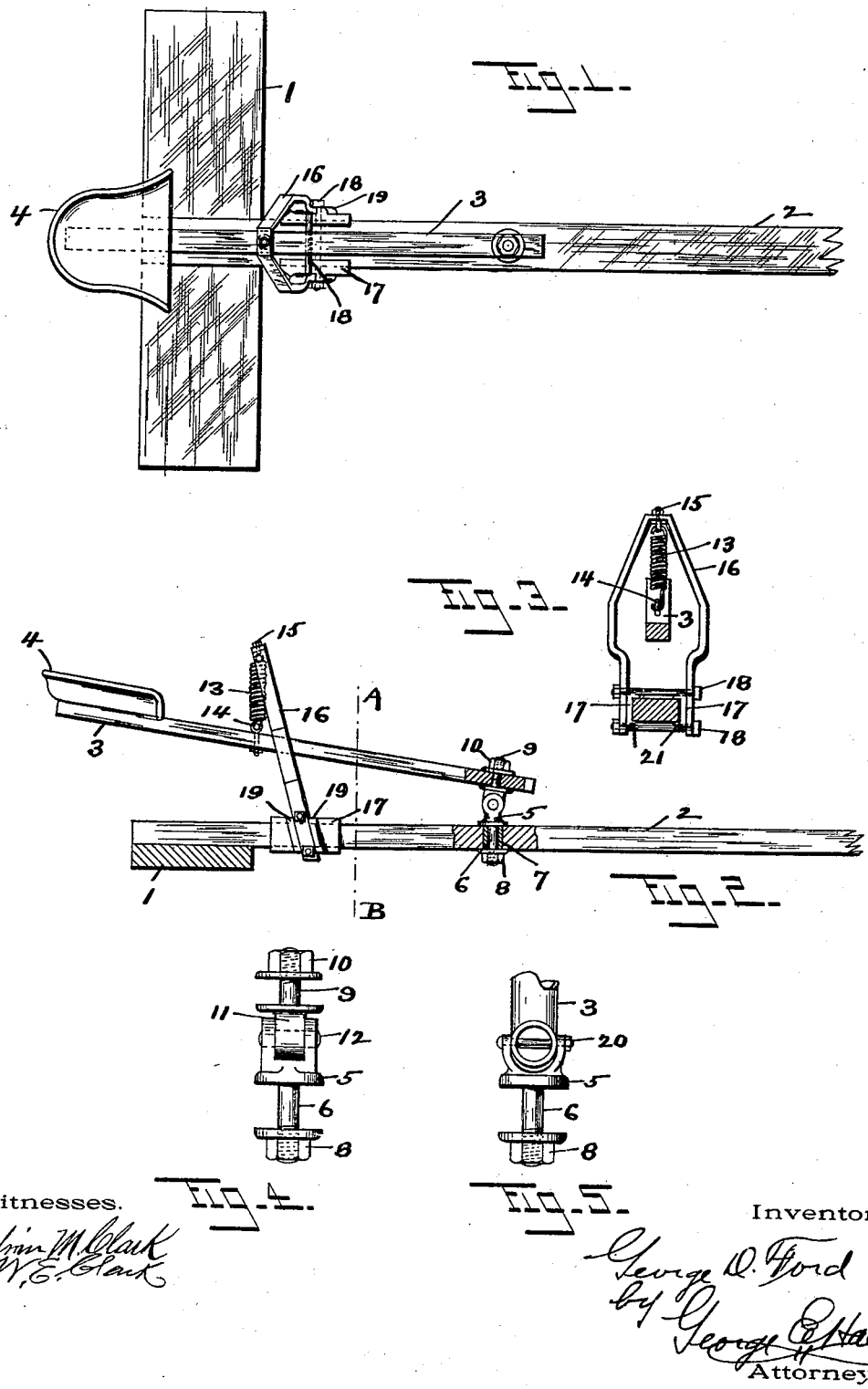
Witnesses.
Inventor.

UNITED STATES PATENT OFFICE.

GEORGE D. FORD, OF NORTH BRANFORD, CONNECTICUT.

SEAT FOR FARM IMPLEMENTS.

SPECIFICATION forming part of Letters Patent No. 666,802, dated January 29, 1901.

Application filed September 5, 1900. Serial No. 29,085. (No model.)

*To all whom it may concern:*

Be it known that I, GEORGE D. FORD, a citizen of the United States, residing at North Branford, in the county of New Haven and State of Connecticut, have invented certain new and useful Improvements in Seats for Farm Implements, of which the following is a specification, reference being had therein to the accompanying drawings.

My invention relates to improvements in seats for farm implements; and its object, among other things, is to construct and mount a seat in such a manner as to permit a yielding movement thereof vertically and a limited movement laterally, thus adapting itself to the inequalities of the ground, and whereby the seat, as far as possible, will remain in a uniform position, so that the rider will not be affected materially by the movement or motion of the implement.

It is a further object of my invention to construct a seat of this character of the fewest possible parts, so designed as to be economically constructed and readily assembled at a minimum cost.

To these and other ends my invention consists in a seat for a farm implement having certain details of construction and combination of parts, as will be hereinafter described, and more particularly pointed out in the claims.

Referring to the drawings, in which like figures of reference designate like parts in the several views, Figure 1 is a plan view of my improved seat as attached to a farm implement. Fig. 2 is a fragmentary side elevation thereof. Fig. 3 is a transverse section upon line A B of Fig. 2. Fig. 4 is a view of one form of the device used to connect the seat-beam with the pole, and Fig. 5 is a modified form thereof.

Referring to the drawings, the numeral 1 designates the body-piece of an agricultural implement or farm-tool, which may be a part of a harrow, surface-roller, planter, or any other form of farm implement, and to which is secured the pole 2 in any convenient or well-known manner. Pivotally connected at one end by a universal joint with the pole 2 is the seat-beam 3, having a seat 4 fixed to its opposite end, upon which the driver is seated while the farm implement is in operation. The seat-beam 3 may be constructed of wood or metal, and, if desired, may be made of pipe, as shown in Fig. 5. The means for connecting the seat-beam 3 with the pole 2 when a wooden beam is used is shown in Figs. 2 and 4 and comprises a yoke-bolt 5, having a shank 6, which passes freely through a sleeve 7, fixed in the pole 2, a washer-nut 8, a swivel-bolt 9, having a head 11 thereon, which head is movable between the ears of the yoke-bolt 5 and pivotally secured therein by the pintle 12, and a washer-nut 10. By this connection it will be noted that a vertical movement of the beam 3 is permissible by reason of the pintle connection between the head 11 of the swivel-bolt and the yoke-bolt 5, and a lateral movement of the seat end is obtained by reason of the swivel connection of the yoke-bolt 5 with the sleeve 7.

If a pipe is used for the seat-beam 3, as shown in Fig. 5, the swivel-bolt 9 is discarded, as the pipe can be secured between the ears of the yoke-bolt 5 by a pintle or bolt 20, the said yoke-bolt being connected to the pole 2 in the manner heretofore described.

The seat-beam 3 is supported by the spring 13, which is secured at its lower end by the eyebolt 14 to the seat-beam and at its upper end by the eyebolt 15 to the top of the supporting-loop 16, which supporting-loop is secured at its lower end upon either side of the pole 2 by means of the friction-blocks 17 and the bolts 18. The friction-blocks 17 are provided with lips 21, which project over the pole 2, and with integral lugs 19, between which the supporting-loop 16 is held against displacement. If it is desired to shift the supporting-loop 16 along the pole 2, unloosen the nuts upon the bolts 18 and move the supporting-loop to its new position, after which by again tightening the nuts the loop is held rigidly against movement.

It is apparent from the drawings that a seat mounted as herein shown and described will have a vertical movement which is yielding by reason of the spring 13 and will move laterally by reason of the pivotal connection of the seat-beam 3 with the pole 2.

There are minor changes and alterations that can be made within my invention, and I would therefore have it understood that I do not limit myself to the exact construction herein shown and described, but claim all that falls fairly within the spirit and scope of my invention.

I am aware that seats have been connected with farm implements whereby they may have a lateral and a vertical movement, and therefore do not claim such construction broadly.

What I claim as new, and desire to secure by Letters Patent, is—

1. The combination with the pole, of the seat-beam pivotally connected therewith at one end, and having a seat upon the opposite end; a rigid supporting-loop connected with the said pole in such a manner as to permit of its adjustment lengthwise thereof; and a coil-spring secured at one end to the supporting-loop and at the other end to the seat-beam.

2. The combination with the pole 2; of the seat-beam 3 provided with a seat 4 and having the swivel-bolt 9 therethrough; the yoke-bolt 5 rotatably mounted in the said seat-beam and between the ears of which the said swivel-bolt 9 is pivotally secured; a rigid supporting-loop 16; friction-blocks 17 having lugs 19 thereon between which the ends of the said supporting-loop are rigidly held; and a coil-spring 13 connected to the supporting-loop 16 at one end and to the seat-beam at the other end.

In testimony whereof I affix my signature in presence of two witnesses.

GEORGE D. FORD.

Witnesses:
GEORGE E. HALL,
WALLACE S. MOYLE.